US012368234B2

(12) United States Patent
Chung et al.

(10) Patent No.: US 12,368,234 B2
(45) Date of Patent: Jul. 22, 2025

(54) FIBRE-BASED WEARABLE PATCH ANTENNA

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Jae-Young Chung, Seoul (KR); Philip Ayiku Dzagbletey, Seoul (KR); Gwang Hun Jeon, Gangwon-do (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 122 days.

(21) Appl. No.: 18/248,203

(22) PCT Filed: Jun. 15, 2021

(86) PCT No.: PCT/KR2021/007440
§ 371 (c)(1),
(2) Date: Apr. 6, 2023

(87) PCT Pub. No.: WO2022/092479
PCT Pub. Date: May 5, 2022

(65) Prior Publication Data
US 2023/0387574 A1 Nov. 30, 2023

(30) Foreign Application Priority Data
Nov. 2, 2020 (KR) ........................ 10-2020-0144064

(51) Int. Cl.
*H01Q 1/27* (2006.01)
*H01Q 1/48* (2006.01)
*H01Q 9/04* (2006.01)

(52) U.S. Cl.
CPC ............... *H01Q 1/273* (2013.01); *H01Q 1/48* (2013.01); *H01Q 9/0407* (2013.01)

(58) Field of Classification Search
USPC .......................................................... 343/718
See application file for complete search history.

(56) References Cited

U.S. PATENT DOCUMENTS 3,329,957 A * 7/1967 Hoynes .................. H01Q 1/273 343/718
6,377,216 B1 * 4/2002 Cheadle ................. H01Q 1/273 343/718
(Continued)

FOREIGN PATENT DOCUMENTS

GB 2476087 A * 6/2011 ............... H01Q 1/48
JP 2009212660 A 9/2009
(Continued)

OTHER PUBLICATIONS

WIPO, Korean International Search Authority, International Search Report and Written Opinion (with English translation) mailed Nov. 4, 2021 in International Patent Application No. PCT/KR2021/007440, 12 pages.

*Primary Examiner* — Dameon E Levi
*Assistant Examiner* — Brandon Sean Woods
(74) *Attorney, Agent, or Firm* — Inskeep IP Group, Inc.

(57) ABSTRACT

Disclosed is a fibre-based wearable patch antenna. The fibre-based wearable patch antenna comprises: a radiating patch; a substrate on which the radiating patch is attached; a ground surface which is located below the substrate and has a slot formed therein; and a cable for the supply of power
(Continued)

to the radiating patch, wherein the invention is formed integrally with clothing and the cable can be attached below the ground surface.

8 Claims, 4 Drawing Sheets

(56) References Cited

U.S. PATENT DOCUMENTS

| | | | | |
|---|---|---|---|---|
| 2005/0235482 | A1* | 10/2005 | Deaett | H01Q 9/0407 343/700 MS |
| 2013/0293429 | A1* | 11/2013 | Keller | H01Q 1/00 977/840 |
| 2015/0041540 | A1* | 2/2015 | Qu | H01Q 1/38 29/601 |
| 2018/0018843 | A1* | 1/2018 | Gengler | G07C 9/00571 |
| 2019/0058244 | A1* | 2/2019 | Kim | H01Q 1/243 |

FOREIGN PATENT DOCUMENTS

| | | | |
|---|---|---|---|
| KR | 20040094772 | A | 11/2004 |
| KR | 20110026815 | A | 3/2011 |
| KR | 20110109494 | A | 10/2011 |
| KR | 20170038357 | A | 4/2017 |

* cited by examiner

FIBRE-BASED WEARABLE PATCH ANTENNA

RELATED APPLICATIONS

This application is the U.S. National Phase of and claims priority to International Patent Application No. PCT/KR2021/007440, International Filing Date Jun. 15, 2021, entitled Fibre-Based Wearable Patch Antenna; which claims benefit of and priority to Korean Patent Application No. 10-2020-0144064 filed Nov. 2, 2020, in the Korean Intellectual Property Office, both of which are incorporated herein by reference in their entireties.

TECHNICAL FIELD

The following embodiments relate to a fibre-based wearable patch antenna.

BACKGROUND ART

Wireless communication technology is rapidly evolving so that more information can be accessed more conveniently. Along with this, wireless communication devices are being developed into the forms that can be wearable on human bodies or forms of clothes, beyond the trend of miniaturization.

Recently, interest in smart clothes and wearable devices using conductive smart textile has rapidly been increasing not only in the clothing industry but also in Information Technology (IT) and the medical and defense industries. Conductive smart textile has high conductivity, so it can allow electricity to flow therethrough like a general metal, and it maintains the flexibility and elasticity of cloth material, so it is a key material for realizing wearable devices integrated with clothing.

One of the biggest obstacles to the implementation of wearable communication devices integrated with clothing is designing and manufacturing antennas using the conductive smart textile. An antenna is larger than other communication components and its performance is greatly influenced by the surrounding environment. A small antenna that can efficiently radiate electromagnetic waves has to be designed considering the material characteristics of the conductive smart textile, which is different from a general electronic board.

DISCLOSURE OF THE INVENTION

Technical Solutions

A patch antenna according to an embodiment includes: a radiating patch; a substrate on which the radiating patch is attached; a ground surface which is located under the substrate and has a slot formed therein; and a cable for the supply of power to the radiating patch, wherein the patch antenna may be formed integrally with clothing, and the cable may be attached under the ground surface.

The cable may be attached directly under the ground surface in parallel to the ground surface, such that the cable may cross the slot under the ground surface without a metal connector.

The cable may be attached under the ground surface, such that a conductive portion in the cable may cross the slot under the ground surface.

In the patch antenna according to an embodiment, the cable connected to the conductive portion may be attached under the ground surface along the ground surface and extends in one direction of the ground surface to supply power in a side-fed manner.

The patch antenna according to an embodiment may be supplied with power by electromagnetic coupling through the slot between the conductive portion and the radiating patch.

In the patch antenna according to an embodiment, a resonance frequency may be determined by a size of the slot.

In the patch antenna according to an embodiment, a resonance frequency may be determined by a size of the radiating patch.

The radiating patch, the substrate and the ground surface may include fiber material.

The substrate may include neoprene, and the radiating patch and the ground surface may include flat yarn.

The cable may be attached using silicon tape or copper tape.

BEST MODE FOR CARRYING OUT THE INVENTION

Figure 1:
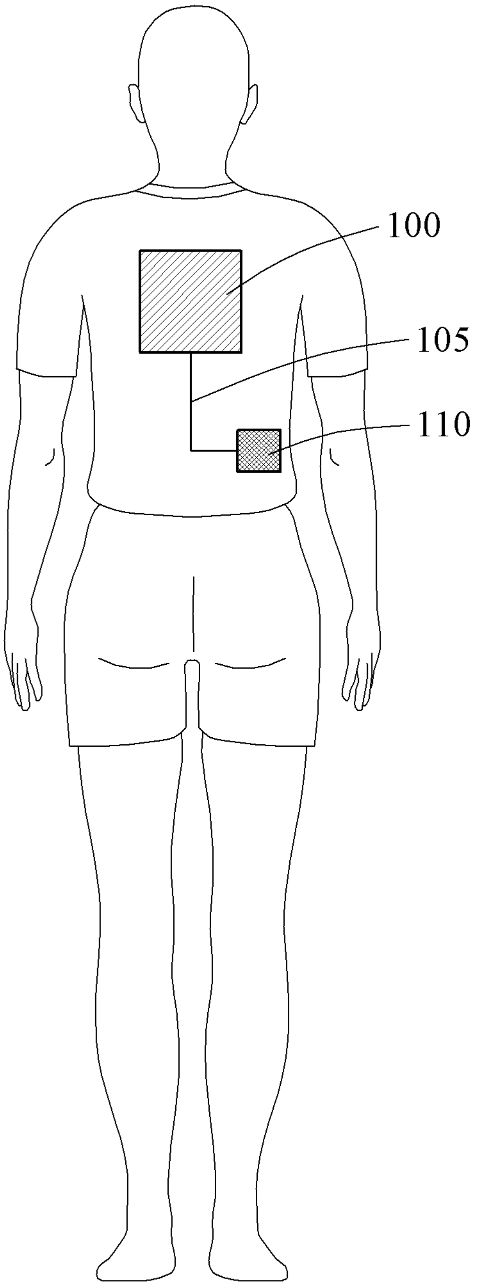
FIG. 1 is a diagram illustrating a fiber-based wearable patch antenna according to an embodiment.

The following detailed structural or functional description of embodiments is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is “connected”, “coupled”, or “joined” to another component, a third component may be “connected”, “coupled”, and “joined” between the first and second components, although the first component may be directly connected, coupled, or joined to the second component.

The singular forms “a,” “an,” and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by those having ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a fiber-based wearable patch antenna according to an embodiment.

A patch antenna 100 according to an embodiment may include a radiating patch, a substrate on which the radiating patch is attached, a ground surface which is located under the substrate and has a slot formed therein and a cable 105 for the supply of power to the radiating patch.

The patch antenna 100 according to an embodiment may be integrally formed with clothing. The radiating patch, the substrate, and the ground surface of the patch antenna 100 may include fiber material, so that the patch antenna 100 may have stretch flexibility and may be suitable for being mounted on clothes.

Referring to FIG. 1, the patch antenna 100 is configured as an integrated garment and is connected to a communication module 110 through the cable 105. The patch antenna 100 may not require a metal connector for connecting the cable 105 for power supply, and may be supplied with power by directly attaching the cable 105 under the ground surface of the patch antenna 100. The patch antenna 100 according to an embodiment may be supplied with power using electromagnetic coupling through the slot between the attached cable 105 and the radiating patch.

The patch antenna 100 according to an embodiment may use a side-fed manner in which power is supplied by connecting the cable 105 in a lateral direction of the antenna, instead of a bottom-fed manner in which power is supplied vertically from the back of the antenna. The side-fed manner may be more suitable for being mounted on clothes because it does not interfere with the motion of a person wearing the clothes.

Since the patch antenna 100 has stretch flexibility, it may be formed integrally with clothing as shown in FIG. 1. The patch antenna 100 may be integrally manufactured with miscellaneous goods such as fashion bags and hiking bags, and may be used for special clothing such as firefighting uniforms and military uniforms. The use of the patch antenna 100 is not limited thereto, and the patch antenna 100 may be manufactured and used separately from clothing, or may be used in a form attached to clothing or skin. The patch antenna 100 according to an embodiment may be used as an antenna for smart clothes, wearable communication devices, Internet of Things (IoT) devices, and location tracking systems. A specific configuration of the patch antenna 100 is described in detail with reference to FIGS. 2 and 3.

Figure 2:
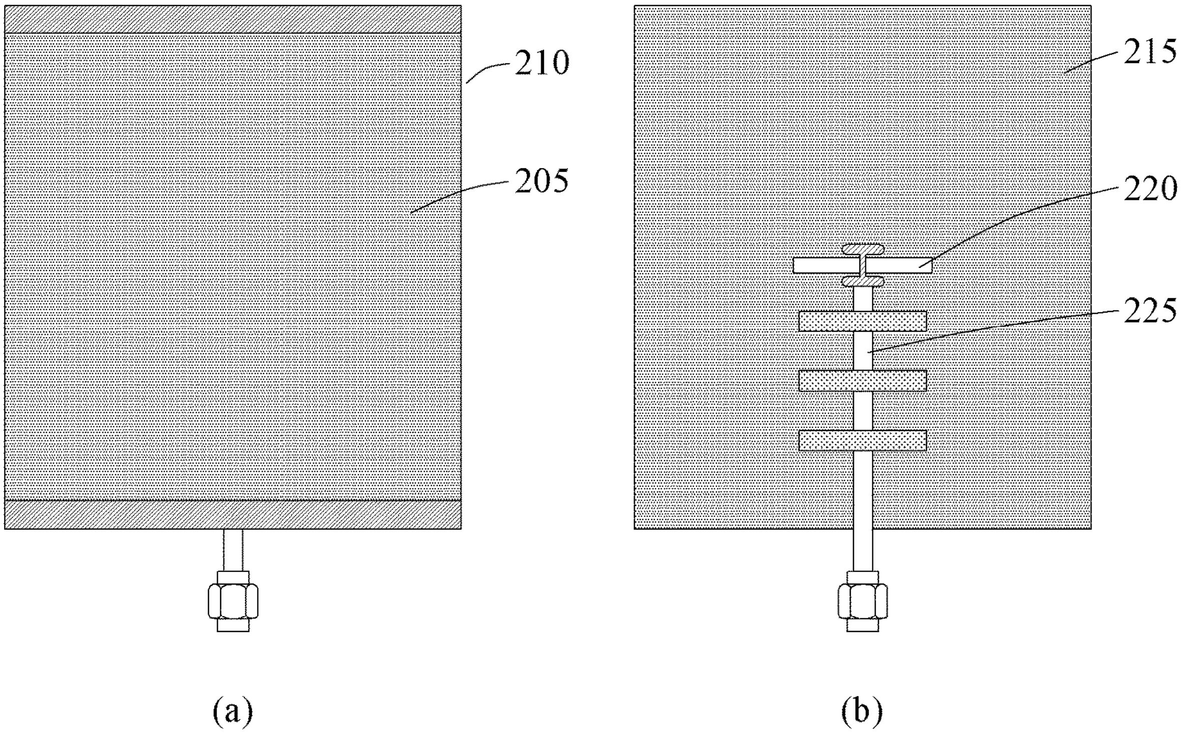
FIG. 2 is a diagram illustrating a configuration of a fiber-based wearable patch antenna according to an embodiment.
Figure 3:
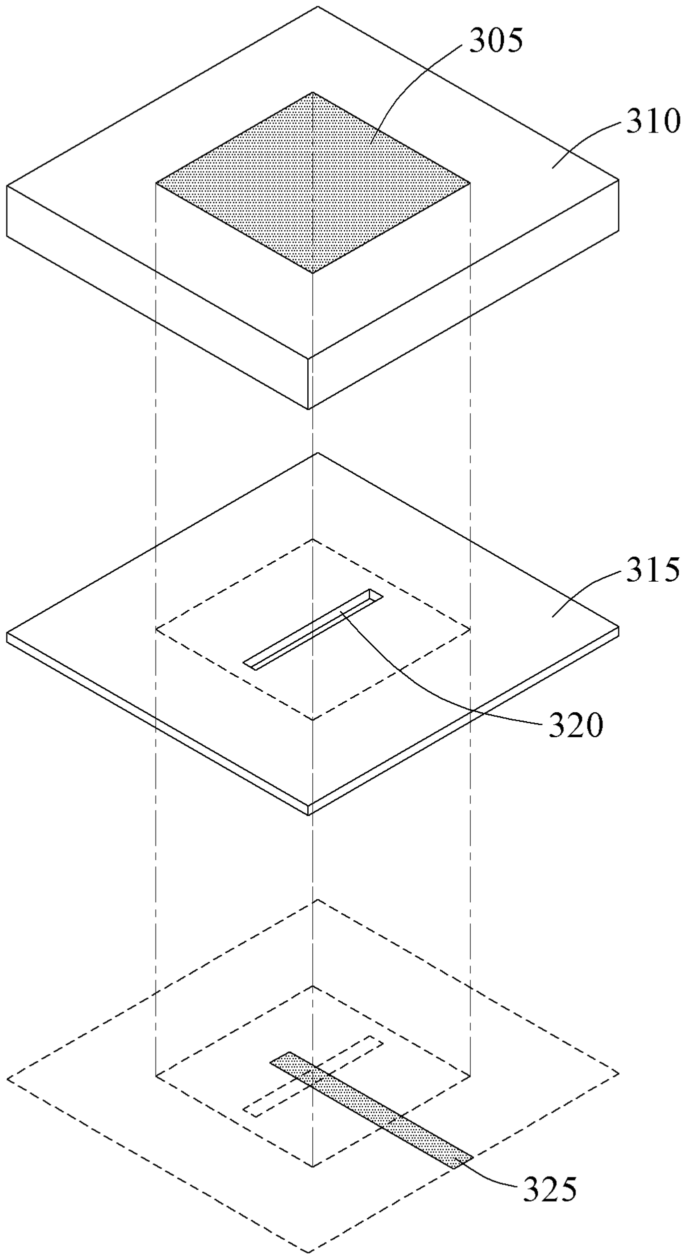
FIG. 3 is a diagram illustrating each component of a fiber-based wearable patch antenna according to an embodiment.

FIG. 2 is a diagram illustrating a configuration of a fiber-based wearable patch antenna according to an embodiment, and FIG. 3 is a diagram illustrating each component of the fiber-based wearable patch antenna according to an embodiment.

Referring to (a) of FIG. 2, a front side of the patch antenna 100 according to an embodiment is illustrated. The patch antenna 100 may include a radiating patch 205 and a substrate 210. The radiating patch 205 and the substrate 210 may include a fiber material. In an embodiment, the substrate 210 may include neoprene. The radiating patch 205 may include flat yarn. The radiating patch 205 may include fiber spread with conductive ink on the flat yarn.

Referring to (b) of FIG. 2, the back side of the patch antenna 100 according to an embodiment is illustrated. The patch antenna 100 may include a ground surface 215 in which a slot 220 is formed and a cable 225 for power supply. In an embodiment, the cable 225 may be a coaxial cable 225. The ground surface 215 may include flat yarn. The ground surface 215 may include fiber spread with conductive ink on the flat yarn.

Materials of the radiating patch 205, the substrate 210, and the ground surface 215 of the patch antenna 100 are not limited to fiber materials, and they may be manufactured using various existing materials such as a printed circuit board (PCB), etc.

The cable 225 of the patch antenna 100 according to an embodiment may be supplied with power without a heavy and bulky metal connector, attaching directly under the ground surface 215 parallel to the ground surface 215 so that the cable 225 crosses the slot 220 under the ground surface 215. If an interface (connector) connecting an antenna and a wearable device is a bulky and heavy metal form as in conventional art, integration with clothing is greatly deteriorated. Since the patch antenna 100 according to an embodiment does not require a metal connector, the patch antenna 100 may be suitable for being mounted on clothing. The patch antenna 100 is easy to manufacture because it does not require a vertical power supply pin in a form of penetrating from the ground surface 215 of the antenna to the radiating surface for power supply, and even if the cable 225 for power supply is connected, the stretch flexibility of the patch antenna 100 may be maintained. Since the patch antenna 100 does not require a metal connector, the size thereof may be reduced compared to a bottom-fed antenna that is supplied with power vertically from the back side of the antenna.

In an embodiment, the cable 225 of the patch antenna 100 may be attached under the ground surface 215 such that a conductive portion in the cable 225 crosses the slot 220 under the ground surface 215. The patch antenna 100 may perform power supply without being electrically connected to the cable 225 for power supply, the ground surface 215, the substrate 210, and the radiating patch 205. Rather than directly applying a current to the radiating patch 205, the conductive portion in the cable 225 is attached to the ground surface 215 and the ground surface 215 includes the slot 220 so that the power may be supplied using electromagnetic coupling through the slot 220 between the radiating patch 205 and the conductive portion in the cable 225.

In the patch antenna 100 according to an embodiment, the cable 225 connected to the conductive portion is attached under the ground surface 215 along the ground surface 215 and extends in one direction of the ground surface 215 to supply power in a side-fed manner. As mentioned above, the patch antenna 100 is suitable as a wearable antenna because it does not interfere with the motion of a person wearing the clothes when the patch antenna is attached to clothing or formed as an antenna integrated with clothing by being powered by a side-fed manner.

In an embodiment, the cable 225 may be attached using silicon tape or copper tape.

Referring to FIG. 3, each component of the patch antenna 100 is illustrated separately. FIG. 3 illustrates a substrate 310 to which a radiating patch 305 is attached, a ground surface 315 formed under the substrate 310 and including a slot 320, and a cable 325 disposed to cross a portion of the slot 320 of the ground surface 315 under the ground surface 315. The radiating patch 305, the substrate 310, the ground surface 315, the slot 320, and the cable 325 of FIG. 3 may correspond to the radiating patch 205, the substrate 210, the ground surface 215, the slot 220, and the cable 225 of FIG. 2, respectively.

Since each component has been described with reference to FIG. 2, duplicated descriptions thereof are omitted.

Figure 4:
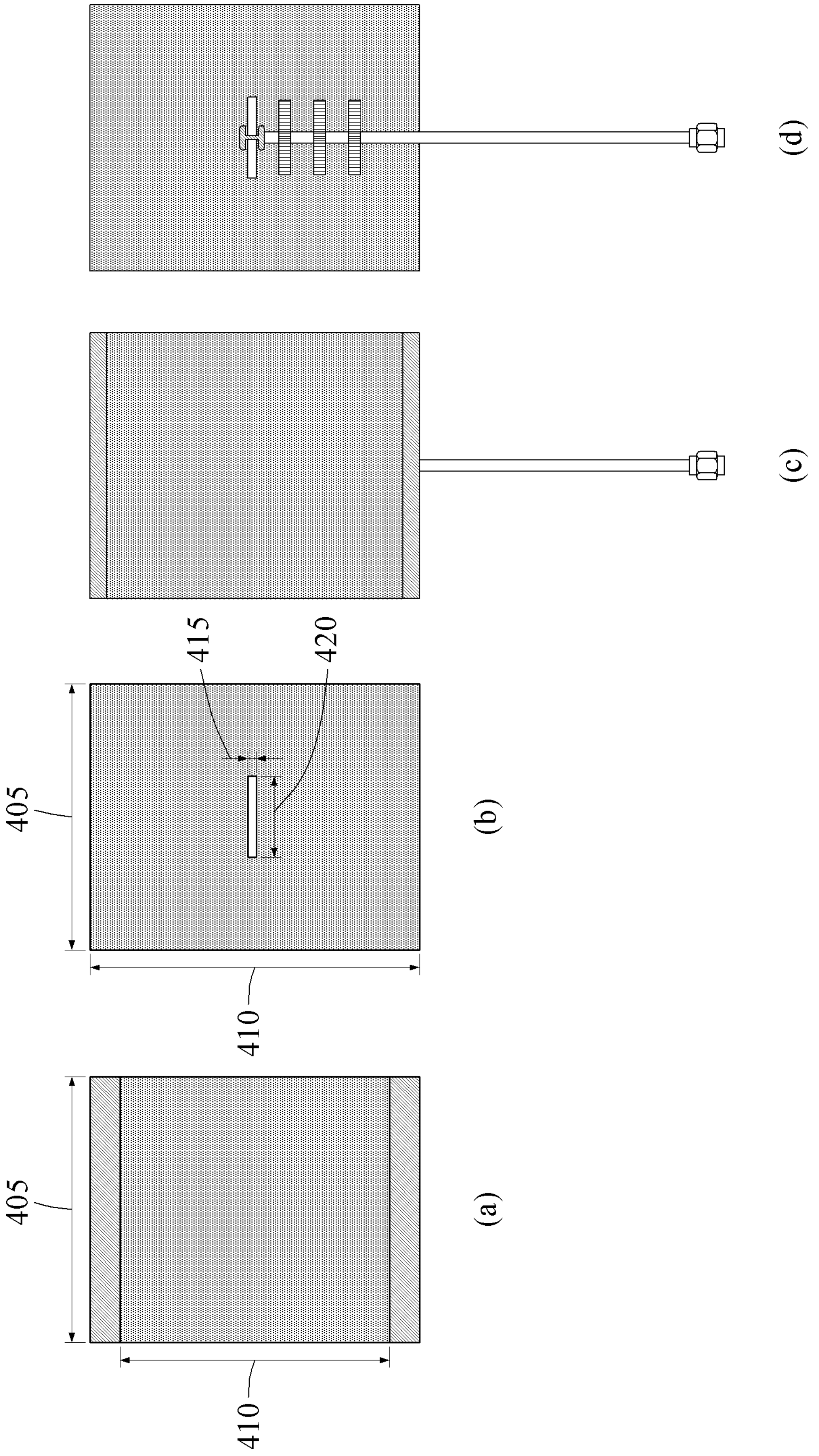
FIG. 4. is a diagram illustrating an embodiment of a fiber-based wearable patch antenna according to the Bluetooth Low Energy (BLE) standard.

FIG. 4. is a diagram illustrating an embodiment of a fiber-based wearable patch antenna according to the Bluetooth Low Energy (BLE) standard.

Referring to (a) of FIG. 4, the front side of a substrate to which a radiating patch is attached according to an embodiment is illustrated, and referring to (b) of FIG. 4, the back side of a ground part having a slot formed therein according to an embodiment is illustrated. Referring to (c) of FIG. 4, the front side of the patch antenna 100 in which a cable is attached to the radiating patch, the substrate, and the ground surface of FIG. 4 (*a*) and FIG. 4 (*b*) is illustrated, and referring to (d) of FIG. 4, the back side of the patch antenna 100 is illustrated.

The patch antenna 100 according to an embodiment may be manufactured according to the BLE communication standard. In this case, the radiating patch of the patch antenna 100 may be formed to have a width 405 of 42 millimeters (mm) and a length 410 of 42.5 mm, and the substrate and the ground surface may be formed to have a width 405 of 42 mm and a length 408 of 42 mm. The slot formed in the ground surface may be formed to have a width 420 of 23 mm and a length 415 of 1 mm. Under the ground surface formed as in (a) and (b) of FIG. 4, the cable may be attached under the ground surface parallel to the ground surface so that the cable crosses the slot under the ground surface as illustrated in (c) and (d) of FIG. 4. In an embodiment, the strength of the attached cable may be improved by using silicon tape or copper tape for attaching the cable. In an embodiment, the substrate may be formed with a thickness of 2 mm including a neoprene material.

When the existing bottom-fed antenna that is supplied with power vertically from the back of the antenna is manufactured according to the BLE communication standard, it should be manufactured to have a size of 60 mm in width and 70 mm in length to achieve the same performance as the patch antenna 100 of FIG. 4. Thus, the patch antenna 100 according to an embodiment may realize an effective reduction in the size of the antenna.

In the patch antenna 100 according to an embodiment, a resonant frequency may be determined by the size of the radiating patch. In addition, the patch antenna 100 according to an embodiment may adjust the resonant frequency according to the slot size. Since the size of the radiating patch and the slot may be easily adjusted during the manufacturing process, performance of the patch antenna 100 may be tuned easily and accurately, and extendability is excellent.

The BLE communication standard of FIG. 4 is only an embodiment and is not limited to the BLE communication standard of the patch antenna 100, and the configuration of the patch antenna 100 may be adjusted according to various communication standards.

The patch antenna 100 according to an embodiment may be manufactured according to the Long Range (LoRa) communication standard. In this case, the radiating patch of the patch antenna 100 may be formed to have a width of 145 mm and a length of 125 mm, and the substrate and the ground surface may be formed to have a width of 145 mm and a length of 150 mm. The slot formed in the ground surface may be formed with a width of 64 mm and a length of 1 mm, and the cable may be attached under the ground surface parallel to the ground surface so that the cable crosses the slot under the ground surface. In an embodiment, the strength of the attached cable may be improved by using silicon tape or copper tape for attaching the cable. In an embodiment, the substrate may be formed with a thickness of 3 mm including a neoprene material.

When the existing bottom-fed antenna that is supplied with power vertically from the back side of the antenna is manufactured according to the LoRa communication standard, it should be manufactured to have a size of 190 mm in width and 190 mm in length to achieve the same performance as the patch antenna 100 of the LoRa communication standard according to an embodiment. Thus, the patch antenna 100 according to an embodiment may realize an effective reduction in the size of the antenna.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The invention claimed is:

1. A patch antenna comprising:

a radiating patch;

a substrate on which the radiating patch is attached;

a ground surface which is located under the substrate and has a slot formed therein; and a coaxial cable for the supply of power to the radiating patch, wherein the patch antenna is formed integrally with clothing, wherein a conductive portion of the coaxial cable includes an H-shaped arrangement which crosses the slot and attaches the coaxial cable directly to an underside of the ground surface; and wherein the coaxial cable extends from the H-shaped arrangement in a single direction along the underside of the ground surface to supply power in a side fed manner.

2. The patch antenna of claim 1, wherein the cable is attached directly under the ground surface in parallel to the ground surface, such that the cable crosses the slot under the ground surface without a metal connector.

3. The patch antenna of claim 2, wherein the patch antenna is supplied with power by electromagnetic coupling through the slot between the conductive portion and the radiating patch.

4. The patch antenna of claim 3, wherein a resonance frequency is determined by a size of the slot.

5. The patch antenna of claim 3, wherein a resonance frequency is determined by a size of the radiating patch.

6. The patch antenna of claim 3, wherein the radiating patch, the substrate, and the ground surface comprise fiber material.

7. The patch antenna of claim 6, wherein the substrate comprises neoprene, and the radiating patch and the ground surface comprise flat yarn.

8. The patch antenna of claim 3, wherein the cable is attached using silicon tape or copper tape.

* * * * *